(12) United States Patent
Hammerschmidt et al.

(10) Patent No.: US 9,767,214 B2
(45) Date of Patent: Sep. 19, 2017

(54) TECHNIQUE AND FRAMEWORK TO PROVIDE DIAGNOSABILITY FOR XML QUERY/DML REWRITE AND XML INDEX SELECTION

(75) Inventors: Beda Christoph Hammerschmidt, San Carlos, CA (US); Zhen Hua Liu, San Mateo, CA (US); Geeta Arora, Union City, CA (US); Thomas Baby, Auburn, WA (US)

(73) Assignee: Oracle International Corporation, Redwood Shores, CA (US)

( * ) Notice: Subject to any disclaimer, the term of this patent is extended or adjusted under 35 U.S.C. 154(b) by 432 days.

(21) Appl. No.: 13/172,573

(22) Filed: Jun. 29, 2011

(65) Prior Publication Data
US 2013/0006964 A1 Jan. 3, 2013

(51) Int. Cl.
G06F 7/00 (2006.01)
G06F 17/00 (2006.01)
G06F 17/30 (2006.01)

(52) U.S. Cl.
CPC ............... *G06F 17/30929* (2013.01)

(58) Field of Classification Search
CPC ......... G06F 17/30297; G06F 17/30457; G06F 17/3053; G06F 17/30935; G06F 17/30929
USPC .......................................... 717/100; 709/201
See application file for complete search history.

(56) References Cited

U.S. PATENT DOCUMENTS

| 5,619,692 | A * | 4/1997 | Malkemus et al. |
| 7,120,645 | B2 * | 10/2006 | Manikutty et al. |
| 7,165,063 | B2 | 1/2007 | Beyer et al. |
| 7,454,413 | B2 * | 11/2008 | Lakshminarayanan et al. |
| 7,577,667 | B2 * | 8/2009 | Hinshaw et al. |
| 7,685,137 | B2 | 3/2010 | Liu et al. |
| 7,685,150 | B2 | 3/2010 | Manikutty et al. |
| 7,716,210 | B2 | 5/2010 | Ozcan et al. |
| 8,560,523 | B2 * | 10/2013 | Larson et al. ............ 707/717 |

(Continued)

OTHER PUBLICATIONS

Ling Li et al. "Rewriting Queries for XML Integration Systems," abstract, http://springerlink.com/content/pmjx025176wk4686/ , 2 pgs.

(Continued)

*Primary Examiner* — Susan Chen
(74) *Attorney, Agent, or Firm* — Hickman Palermo Becker Bingham LLP (57) ABSTRACT

A method and apparatus for automatically analyzing and providing feedback regarding the optimizability of a relational database query. A query developer's primary goal is to ensure that queries and DML operations are rewritten for the most efficient execution. Rewrite diagnosability captures metadata for each attempted query optimization including success or failure and the reasons for failure. The metadata is stored in association with the operators that were not removed through rewriting. Once all optimizations have been attempted and rewriting is complete, the metadata is selectively displayed based on the cost to perform the associated operation. The context of performing the operation may affect the cost. The cost may be based at least on the type of operation and where within the query tree the operation is located. A query developer may configure the database system not to execute the resulting query plan based on one or more criteria.

26 Claims, 7 Drawing Sheets

(56) References Cited

U.S. PATENT DOCUMENTS

| | | | |
|---|---|---|---|
| 2003/0182276 A1* | 9/2003 | Bossman et al. | 707/3 |
| 2007/0174309 A1* | 7/2007 | Pettovello | 707/100 |
| 2009/0125494 A1 | 5/2009 | Baby et al. | |
| 2009/0210383 A1 | 8/2009 | Seemann | |
| 2010/0030727 A1 | 2/2010 | Chandrasekar et al. | |
| 2010/0299367 A1* | 11/2010 | Chakrabarti et al. | 707/803 |

OTHER PUBLICATIONS

Gao Jun et al., "Greedy Cached Query Rewriting in Content-Oriented XML Web Engine," International Parallel and Distributed Processing Symposium: IPDPS 2002 Workshops, http://www.springerlink.com/content/pmjx025176wk4686/ 1 page.

Florent Jacquemard et al., "Rewrite-based verification of XML updates," PPDP '10 Proceedings of the $12^{th}$ International ACM SIGPLAN symposium on Principles and practice of declarative programming, ACM, New York, NY 2010, http://portal.acm.org/citation.cfm?id=1836089.1836105&coll=portal&dl=GUIDE 5 pgs.

Muralidhar Krishnaprasad et al., "Query Rewrite for XML in Oracle XML DB," Proceedings of the $30^{th}$ VLDB Conference, Toronto, Canada, 2004, http://oracle.com/technology/tech/xml/xquery/pdf/vldb04-813-XML_Rewrite-in-OracleXMLDB.pdf 12 pgs.

Eric Pardede et al., "SQL/XML Hierarchical Query Performance Analysis in an XML-Enabled Database System," Journal of Universal Computer Science, vol. 15, No. 10 (2009), http://users.monash.edu.au/dtaniar/Practical-Projects/Experimentation-Oracle-XML(2009).pdf pp. 2058-2077.

Nataliya Rassadko, "Policy Classes and Query Rewriting Algorithm for XML Security Views," University of Trento, via Sommarive 14, 38050 Povo(TN), Italy http://www.dit.unitn.it/rassadko/publications/rass-06-IFIP.pdf 15 pgs.

\* cited by examiner

Base_TAB /auction/site/regions 320

| (Primary Key) rowid | Region |
|---|---|
| 1 | Africa |
| 2 | Europe |

FIG. 3a africa_item_TAB 300

| (Foreign Key) region_ID | (item) id 310 | description 320 | Price 330 |
|---|---|---|---|
| 1 | a30 | .3 carat diamond | 1000 |
| 1 | a89 | Flat panel TV | 1300 |

FIG. 3b

Base_TAB /auction/site/regions 340

| Primary Key rowid | Region | XML (CLOB OR BLOB) /auction/site/regions/*/ |
|---|---|---|
| 1 | Africa | <item>id='a30' description="3 carat diamond" Price=1000</item> |
| 2 | Africa | <item>id='a89' description= "Flat panel TV" Price=1300</item> |

FIG. 3c africa_item_idx_TAB 350

| (item) id | rowid |
|---|---|
| a30 | 1 |
| a89 | 2 |

TECHNIQUE AND FRAMEWORK TO PROVIDE DIAGNOSABILITY FOR XML QUERY/DML REWRITE AND XML INDEX SELECTION

FIELD OF THE INVENTION

The present invention relates to database query processing. More specifically, the present invention is addressed to providing tools to help query developers write optimizable queries.

BACKGROUND

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL).

There are many different versions of SQL, some versions are standard and some proprietary, and there are a variety of extensions. SQL data definition language ("DDL") instructions are issued to a database server to create or configure database objects, such as tables, views, or complex data types.

XML

Extensible Markup Language (XML) is a World Wide Web Consortium (W3C) standard for representing data. XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. An element may have one or more children. The resulting hierarchical structure of XML-formatted data is discussed in terms akin to those used to discuss a family tree. For example, a sub-element is said to descend from its parent element or any element from which its parent descended. A parent element is said to be an ancestor element of any sub-element of itself or of one of its descendant element. Collectively, an element along with its attributes and descendants, are referred to as a tree or a sub-tree.

Many applications are designed to output data in the form of XML documents. Various techniques may be used to store data from such XML documents into a relational database.

Storage and Querying Systems for XML

Various types of storage mechanisms are used to store an XML document. XML documents may be stored in a relational database by shredding the document into individual elements and storing the elements in individual columns of a table. In a database server, an XML document may be stored in a row of a table, and nodes of the XML document may be stored in separate columns in the row.

Alternatively, an entire XML document may be stored as a large object (LOB) in a column of a database table. The large object column may store a character large object (CLOB) stored as text or instead may be stored as a binary large object (BLOB). The binary object may comprise a tokenized stream of XML data. Such a tokenized stream for an XML document may alternatively be stored in volatile memory.

However, while it may be efficient to search object relational storage or binary XML storage down the XML hierarchy from parent to child, these storage structures are not well suited for performing hierarchical navigation that requires traversing ancestor links up the hierarchy or sibling traversal.

XML Query and XPath

It is important for database systems that store XML data to be able to execute queries using XML query languages. XML Query Language (XQuery) and XML Path Language (XPath) are important standards for a query language, which can be used in conjunction with SQL to express a large variety of useful queries. XPath is described in XML Path Language (XPath), version 1.0 (W3C Recommendation 16 Nov. 1999), herein incorporated by reference, as well as in XML Path Language (XPath) 2.0 (W3C Recommendation 23 Jan. 2007), herein incorporated by reference. XQuery is described in XQuery 1.0: An XML Query Language (W3C Recommendation 23 Jan. 2007), herein incorporated by reference.

SQL/XML is a common extension of SQL used when manipulating XML data in an object-relational database. Although the examples are described based on Oracle's SQL, the techniques provided herein are not restricted to any particular version of SQL.

Figure 1:
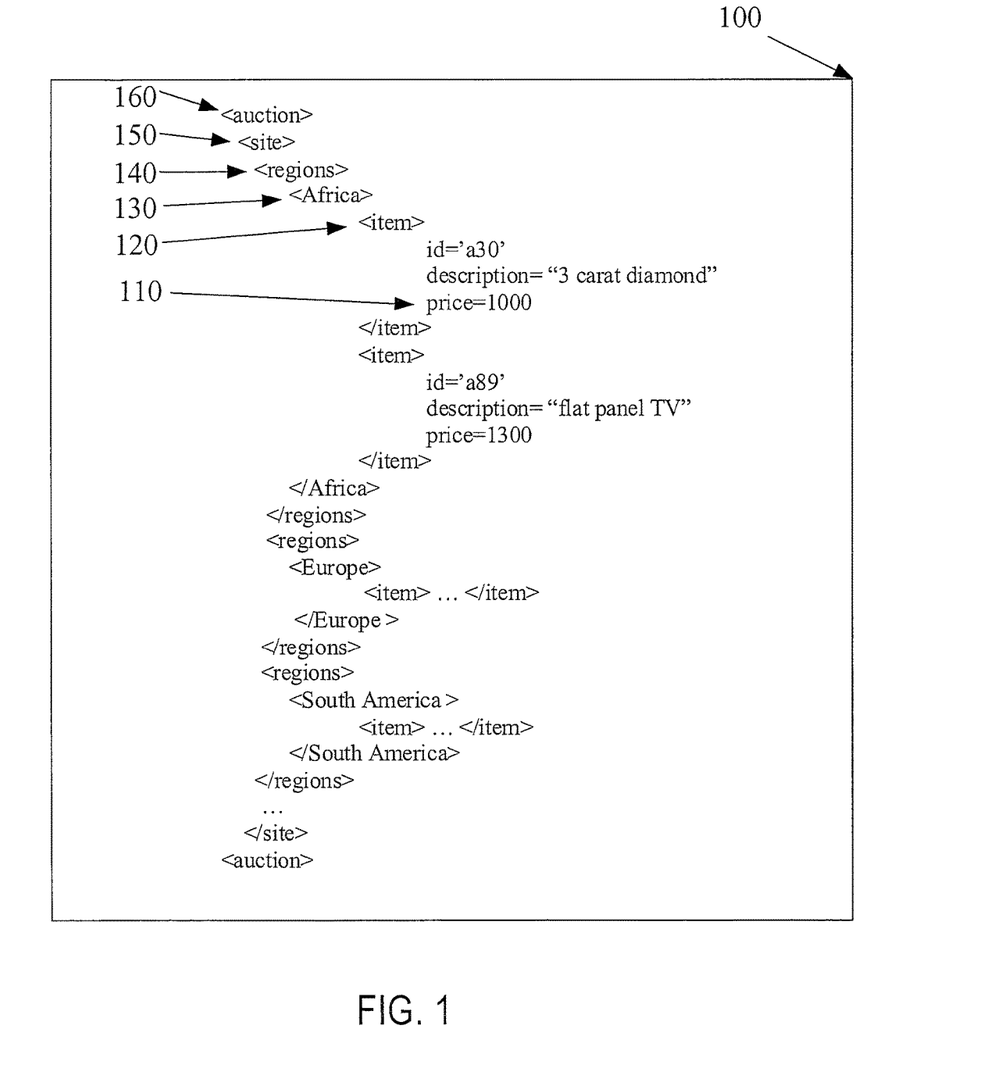
FIG. 1 is a sample XML document used in the examples.

The structure of an XML document establishes parent-child relationships between the nodes within the XML document. The "path" for a node in an XML document reflects the series of parent-child links, starting from a "root" node, to arrive at the particular node. For example, the path to the "price" node in the example XML document 100 shown in FIG. 1 is /auction/site/regions//item/price, since the "price" node 110 is a child of the "item" node 120, and the "item" node 120 is a child of each of the regions (i.e. Africa 130, Europe, South America . . . ). Each region is a child of the regions node 140, the regions node is a child of the site node 150, the site node is a child of the auction node 160 which is a child of the root.

Descending in the tree from parent to child is called forward navigation. Ascending up the hierarchy from child to parent (using the reverse or parent axis) is referred to as "backward," "reverse," or "parent" navigation. Paths that start with slash ("/") are evaluated starting at the root node of the hierarchy.

XML Rewrite

An approach for executing XPath queries over relational and object-relational data exposed as XML is referred to herein as the "rewrite" approach. According to the rewrite approach, XPath queries that access schema-based and non-schema-based XMLType views are dynamically rewritten to directly operate on the underlying object-relational data. Since the entire XML document does not need to manifested, and because relational mechanisms are highly tuned, a query that is rewritten to access relational data can lead to orders of magnitude performance gains over previous approaches.

Specifically, a query rewrite system may take as input (1) the XPath query being rewritten, and (2) the source of the data over which the XPath query is being executed, such as a table or the result of another query. Based on these inputs, the rewrite system rewrites the XPath query to directly access the underlying relational structures that contain the data exposed through the XMLType views.

Unfortunately, not all XPath queries can be rewritten in this fashion. A variety of factors may cause an XPath query to be non-rewritable. Some XPath queries are not rewritable, for example, because the XPath string contains a node that does not map to a column in an object-relational construct. In order to be "mappable," the full structure of the XML data needs to be known at compile time. The full structure may not be known at compile time because of the specific storage used, for lack of an XML schema, or because the XML may be generated from an arbitrary function. For example, if the target of an XPath string is an element of a parent that is stored as a LOB, then the XML query cannot be entirely replaced by an SQL operation that produces the same result. An XPath string that cannot be fully mapped to a corresponding relational structure is referred to herein as an "unmappable path".

Functional Evaluation

The XPath/XQuery languages support the operations that can be performed on a tree. However, storing indexing the XML data as described above may not provide for efficient navigation of tree-traversal. To overcome this problem, an in-memory document object model (DOM) may be created, and the navigation operations may be performed on the DOM. One problem with this approach is that the entire DOM tree may be constructed in memory before the tree traversal can be performed, even if only a few nodes out of the entire tree are needed to evaluate an expression. For a large XML fragment, this presents a scalability issue both in terms of time to build the tree and the amount of memory required to process an XPath expression. Building an in-memory DOM may require ten times as much space as the size of the XML document that the DOM represents. Thus, a 100 MB document may require a gigabyte of memory to hold the DOM tree.

If an XPath section specifies an unmappable path, then the XPath section is not rewritten, and the functional evaluation approach is used to evaluate the XPath operation specified in the XPath section. Specifically, the XML is manifested in memory (e.g. as a DOM) and the XPath is evaluated over the DOM. Unfortunately, the performance of the functional evaluation approach is often unacceptable.

Stages of Query Processing

If a query is expressed using SQL/XML extensions, then re-writing the XML constructs into pure SQL may be performed before executing the following query processing steps.

SQL statements are processed the first time that they execute (unless they are cached in the library cache). An SQL statement expresses the desired outcome but does not tell the server how to evaluate the statement. An SQL statement may, for instance, request all items sold at auction for more than a certain price. When the server receives the statement, the server parses the statement. If the statement does not contain any syntax errors, the server can continue. The server will decide the best way to compute the results. The server chooses whether it is better to read the entire table containing items sold at auction, or whether using an index would be faster. The server's query engine compares the cost of multiple possible approaches. The way that a statement can be physically executed is called an execution plan or a query plan. The optimizer is a component of the database server that is responsible for computing the optimal execution plan. The optimizer bases the optimal execution plan on the optimizer's knowledge of the database content.

An execution plan is composed of primitive operations. Examples of primitive operations are: reading a table completely, using an index, performing a nested loop or a hash join, etc. . . . . All primitive operations have an output: their result set. Some, like the nested loop, have one input. Others, like the hash join, have two inputs. Each input should be connected to the output of another primitive operation.

Explain Plan

It is important for database application developers to write efficient queries. A bad statement in a query can cause the query to be inefficient, causing database processors to become overloaded and degrade response time or increase execution time for all work done on the system. Unfortunately, suboptimal statements are difficult to avoid. Applications are generally tested against a much smaller amount of data than what exists in a production environment, so performance problems are not likely to be detected during the testing phase of query development. The affect of performing a suboptimal operator may be greatly magnified and have an enormous impact on the overall performance of a query when run on massive amounts of production data.

An explain plan is a user-viewable representation of the query execution plan. It may be used for troubleshooting performance issues in a database. An execution plan defines how the database server finds or writes the data specified in a query. For example, the query processing engine decides whether an index exists that can be used to execute the query, and if there is more than one index, which of the indexes to use. The results of the decisions made by the optimizer are included in the execution plan. An SQL statement, such as "EXPLAIN PLAN", may be specified to request an explain plan. When processing an EXPLAIN PLAN statement, the database server analyzes the statement and fills a special table with the execution plan for that statement. The query optimizer may only report on the generation of row sources in the explain plan and may not report the list of operators that do not produce a new row source. In other words, there may be no information in the explain plan regarding operations that affect the content of a row source but do not affect the cardinality of the row source, even though these operations may significantly impact the performance of the query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

There may be a variety of ways to express a particular query, each variety returning the same result set. One way of expressing a query may allow the query optimizer to rewrite the query for better performance than another way of expressing the same query. One of a query developer's primary goals is to ensure that query and DML operations are rewritten for the most efficient execution. However, it may be difficult for query developers to know how best to express a query to enable optimization because such knowledge may depend on internal database structures and procedures that are not visible to developers. More detailed information may be needed in the explain plan regarding attempts and failures to eliminate expensive operations. With that additional information, a developer may be able to restructure a query expression for better optimization.

The technique described herein may be used in a query developer tool. The tool comprises three stages: query tree construction and optimization, rewrite diagnosis, and conditional query plan execution. The query tree construction may proceed as usual for a query; however, as each optimization technique is tried, the query optimizer store information in association with each operator that remains in the query tree along with a reason why the optimization failed to remove the operator from the tree.

Figure 2:
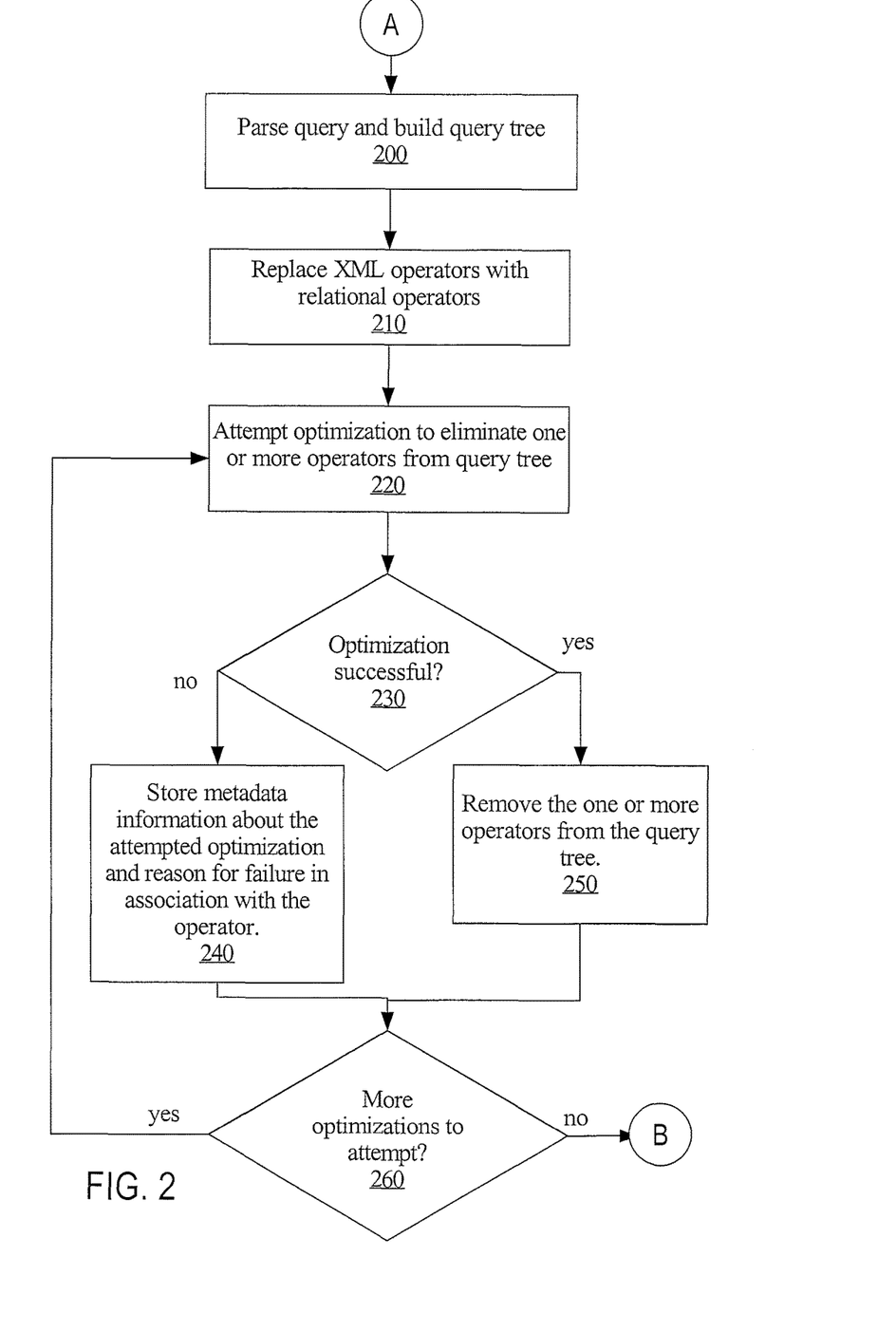
FIG. 2 is a flow diagram illustrating the steps for constructing and pruning a query tree, according to an embodiment of the invention.

FIG. 2 illustrates the steps for query tree construction and optimization. In Step 200, the query is parsed and the query tree is built. In Step 210, XML rewrite may be performed on the query tree to translate XML operators into SQL statements that operate over the relational database constructs rather than performing functional evaluation on an XML hierarchy. XML rewrite occurs during a logical optimization phase that is database-independent. In Step 220, one of a variety of optimizations is tried, such as rewriting the query to use an index. The optimizations are performed during a physical optimization stage that determines which tables and indexes will be used for each data source. Thus, the optimizations tried at this stage are specific to the storage model. For example, when XML data is shredded such that every element in the document may be stored in a column of a table, finding an index on the columns holding the data values is an appropriate optimization to try. Alternatively, when XML data is stored in an XMLType table, where some or all of the XML data may be stored as a CLOB or BLOB in a column of a table, then using streaming evaluation is an optimization that can be tried instead of functional evaluation of the CLOB/BLOB. The physical optimizations are based on cost, using information about the content of tables, such as the frequency of certain data values in a column. Cost information may also consider the definition of indexes.

In Step 230, success or failure of an optimization is determined. If an optimization attempt to replace or remove an operator did not succeed, then in Step 240, the operator remains in the tree, and information indicating a reason for the failure to optimize is stored in association with the operator that would have been removed if the optimization had succeeded. If the optimization succeeded, then in Step 250, the operator is removed from the query tree. In Step 260, it is determined whether there are any more optimizations to attempt. If so, flow returns to Step 220. If not, the query optimization process is complete. At the end of optimization, the remaining operators in the query tree become the query execution plan.

Because several different optimizations may be attempted, there may be multiple attempts to eliminate the same operator through different optimizations. It is possible for one optimization to fail and another to succeed for the same operator. In an embodiment, once an operator is eliminated from the query tree, the query developer may not be informed that an earlier attempt at optimization failed. Once eliminated, the operator will not be in the query tree at analysis time and no information may be provided to the developer about that operator.

Once all optimizations have been attempted and rewriting is complete, the final query tree is analyzed and selected metadata stored in association with certain query tree operators are displayed to the query developer. The metadata is selected for display based on the impact of the corresponding operator to the overall performance of the query. A goal is to focus a query developer's attention on just those issues that may have the most impact on query performance. For example, it may be useful to highlight a reason why a very expensive operator failed to be eliminated through optimization so that the issue causing the failure can be resolved.

After the report is provided to the query developer, the system may determine whether or not to execute the resulting query plan. A query developer may want to interact with the tool for development and debugging until there are no remaining rewrite issues before executing the query. A system administrator/operator may want to prevent suboptimal queries from running on an operational system because a suboptimal query could slow the performance of the other applications running on the system. Determining whether or not the system should execute the query plan may be based on a combination of user preferences and the nature of the optimization failures.

Example Query on XML Data

When an XML document is stored in a database, the document may be shredded, and the contents of the document stored in database tables. Although it is convenient for query writers to be able to write and execute XML-based queries on the data without regard to the underlying database storage, a query written using XML constructs may be inefficient to execute. Before an XML-based query can be executed, the data in the relational tables may be read into a hierarchical structure on which the XML-based commands may be executed.

The following is an example of a database query that uses SQL/XML extensions. An example XML document is provided in FIG. 1.

TABLE 1

XML Query

SELECT XMLQuery(
   'for $i in /site/regions/Africa/item[id = "a89"]
      return $i/description'
   passing tab returning content)
FROM auction_tab tab;

The XMLQuery statement is evaluated over the data in the auction_tab table and returned. The auction_tab table represents the corpus of all XML documents used as input to the query. The XML document has a path to a node "/site/region/Africa/item" representing items sold at an auction in the Africa region. The item node has an attribute "id." The item description is returned for each of the items sold at auction in the Africa region whose item id value is 'a89'. To process this query, a DOM tree representing the XML document would be built in memory, and then the tree would be navigated to find all nodes matching the path expression /site/region/Africa/item. For each matching node, the value of the id attribute is compared against 'a89.' The contents of the description element of those nodes having a matching id attribute are returned as the result of the query. For example, the output based on the example document would be "Flat panel TV."

Constructing a DOM tree in memory and then navigating the tree may be very time consuming and lead to an inefficient query, especially if the document is large. To avoid performing functional evaluation on a fragment of an XML document, the query may be rewritten based on the underlying relational constructs used to store the XML data. For example, if an XML document is shredded, and values of nodes are stored in a column of a table, the value of a column may be found and read faster than constructing a tree and navigating the tree to obtain the same information.

Figure 3A:
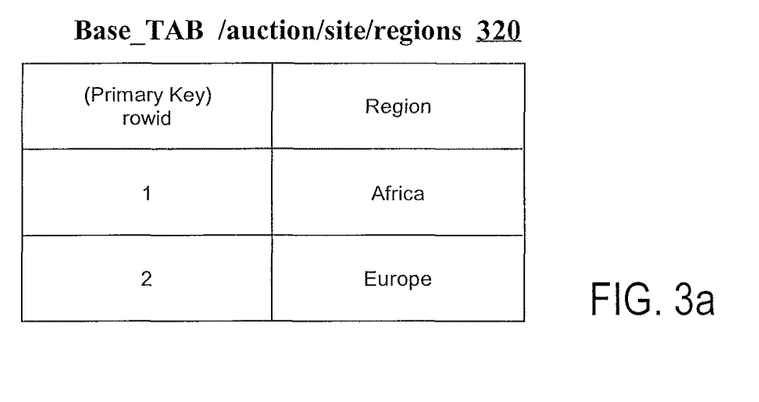
FIG. 3a illustrates example master relational table for holding XML document data stored in object-relational format, according to an embodiment of the invention.
Figure 3B:
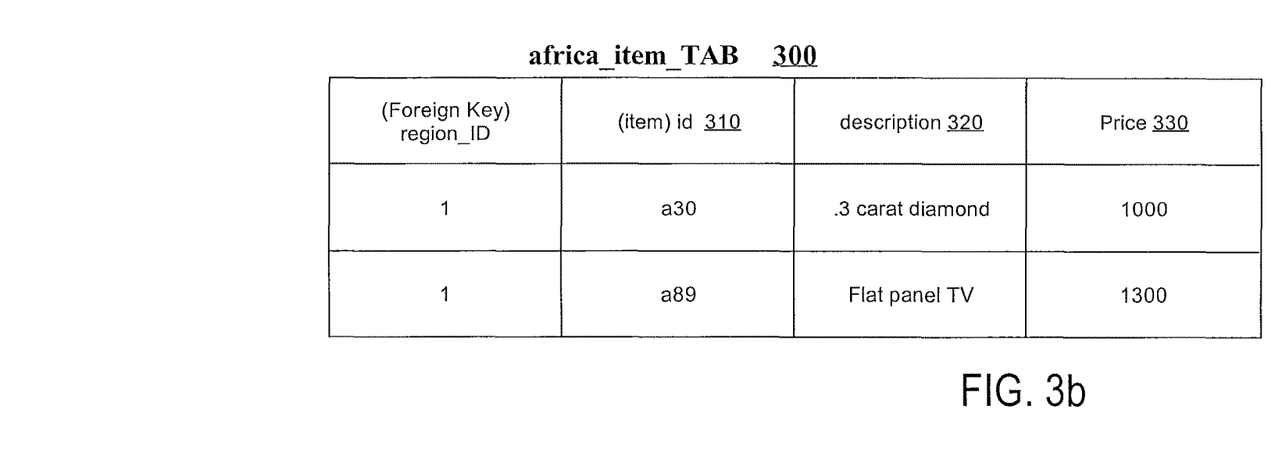
FIG. 3b illustrates example slave relational table for holding shredded XML document data, according to an embodiment of the invention.

FIGS. 3a-3d illustrate a set of example relational tables that may be used to store the example XML document. FIGS. 3a and 3b are example tables that may be created when the XML is shredded and stored according to an object-relational model. Each element defined by the XML schema corresponds to a column of a table. The base table, Base_TAB 320 contains one row for each region. An item table for each region may include a column to hold a foreign key to the base table to identify for each item in which region it was sold. FIG. 3b illustrates a table called "Africa_item_TAB" 300 that contains one row for each item sold at auction in the African region. An item row contains columns to hold at least the id, description, and price of the item.

TABLE 2

Relational query

SELECT item.description
   FROM Africa_item_TAB item
   WHERE item.id = 'a89' AND
      Africa_item_TAB.region_ID =
      Base_TAB.rowid The description field of a row in the Africa_item_TAB 300 is returned if the contents of the row's (item) id field matches 'a89'. This relational query returns the same output as the original SQL/XML query above, (i.e. "Flat panel TV") but this relational query can be executed much faster. It is performed directly on the underlying database tables without having to construct a DOM.

Figure 3C:
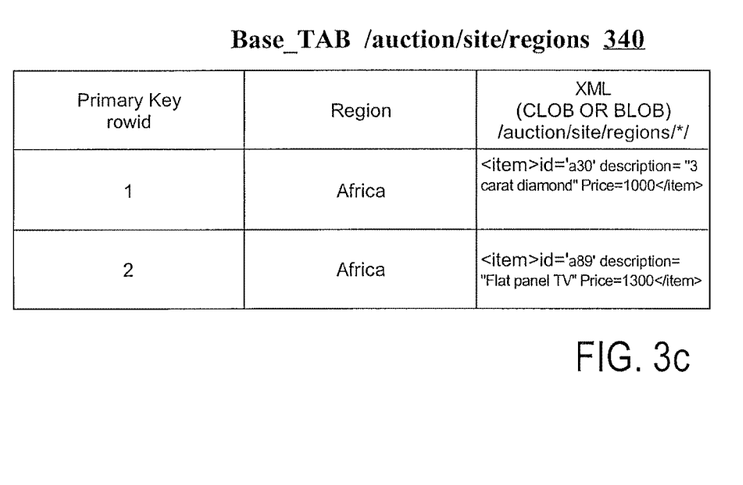
FIG. 3c illustrates example XMLType master relational table for holding XML document data stored as a CLOB or BLOB, according to an embodiment of the invention.
Figure 3D:
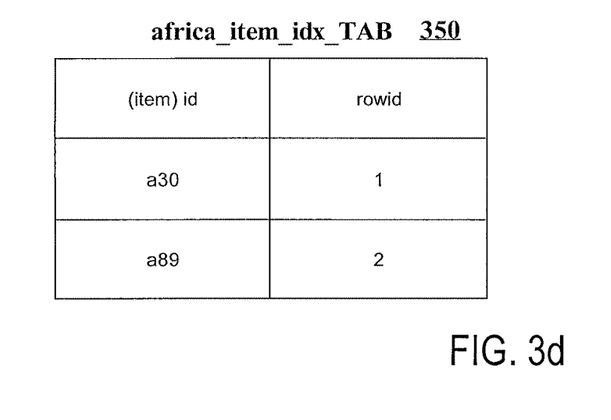
FIG. 3d illustrates an index on the XMLType master table, according to an embodiment of the invention.

FIGS. 3c and 3d are tables illustrating a different way to store the same example XML document. In this example, the XML document is not shredded, but rather stored in an XMLType table. The XML data may be stored as a character large object (CLOB) or encoded and stored as a binary large object (BLOB). In an embodiment, the master table 340 may contain one row for each document, and the entire XML document may be stored as a CLOB or BLOB in a single column of the table. An index, such as illustrated in Africa_item_idx 350, may be built on particular elements of the document that are frequently used for querying.

In another embodiment, the master table itself may include columns for holding element values that are extracted from the XML document. Another embodiment may use a hybrid approach. For example, the master table may contain one row for each item sold at auction and the corresponding XML fragment for the item stored as a CLOB or BLOB. In addition, a value of certain data elements frequently used for querying may be placed in a column by itself.

In FIG. 3c, the name of the region has been extracted from each document and the region name appears in a separate column. The XML data below each region in the document is stored as a CLOB (in this example) in the XML column. In this example, an optimization to use an index and to select which index to use is attempted. FIG. 3d illustrates a sample index on the Base_TAB table 340.

For example, the example XML query from Table 1 may be rewritten to use these relational constructs, including an index as shown in Table 3:

TABLE 3

Relational query using an index

SELECT item.description
   FROM africa_item_idx_TAB item,
   Base_TAB base_tab
   WHERE item.id = 'a89' AND
      item.rowid = based_tab.rowid The query optimizer may recognize that an index exists for quickly finding items with a particular item id and may rewrite the query to use the index. Each matching index entry contains a rowid corresponding to an auction item in a row of the Base_TAB 340. In an alternate embodiment, once the items are identified, functional evaluation on the CLOB data is performed to extract the value of the description. The result is the same as for the other query examples, "Flat panel TV." In an embodiment, the item description may be extracted and placed in a separate column of the base table. In that embodiment, once the item rows are identified, the description is readily available without further evaluation of the XML CLOB.

In an alternative embodiment, the XML data may be stored as a BLOB. A BLOB is binary encoded. Once the item rows are identified for items having an id matching 'a89', the BLOB is evaluated through streaming if possible. If it is not possible to stream the XML data, then functional evaluation is performed on the BLOB, which may include decoding the data.

Factors that May Cause Optimizations to Fail

There are various factors that may cause a query optimization to fail, resulting in a poorly performing query. When translating an XML query into SQL, some XML constructs, such as a procedural XQuery expression, may have no equivalent SQL construct. For example, an XQuery FLWR construct (for-loop-where-return) provides iteration. There is no iterative statement in SQL. Another potential cause of optimization failure is that an XML schema may define an element to be of a type that has no equivalent data type in SQL, such as type ANY. Also, there may be limitations in the XML rewrite implementation that does not cover all possible cases. For example, the XML rewrite functionality may not translate certain navigational steps such as parent or sibling navigation.

When optimizing an SQL query, the query optimizer may fail to recognize that an index may be used because the query expression does not match the index definition exactly. If the index definition and/or the query are complex, finding the reason for failed matching may be non-trivial. Even if the query optimizer recognizes that an index is available, the optimizer may not select to use the index for optimization because performing the query using the index may be more expensive than performing the query without the index. For example, if most of the rows in a table are expected to be included in the row source, then an index will not increase performance over a simple table scan, and the overhead associated with the index might make it more expensive than a table scan.

When the XML data is stored as a BLOB, if the path expression in the query uses parent navigation, streaming evaluation of the BLOB may not be possible. For performing an update on a node identified by a path expression that includes the reverse axis " . . . ", streaming evaluation may not be possible because streaming does not support the reverse axis operator " . . . ".

For all of the above rewrite cases it is also possible that a bug in the implementation of the XML rewrite mechanism may prevent rewrite from happening.

Developers can Rewrite a Query to Enable Optimization

A query developer who is aware of an optimization failure and the cause of the failure may find a different way to express the query to achieve the originally desired outcome, and to allow optimization to succeed. For example, a developer may try to avoid using a procedural XQuery expression, avoid using any XML Schema data type that does not have an equivalent in SQL, and avoid using Path expressions with reverse navigation. Also, a query could be rewritten to directly match the definition of an index so that the index will be recognized and selected. In addition, a developer may request system reconfiguration (including bug fixes in the platform) to enable the query to be optimized.

Diagnosability Evaluation

Query optimizations may be rule-based. That is, rules declaratively express the conditions under which an optimization may be performed. The rule also encodes how to perform the optimization if the condition is met. An optimization rule may include the ability to explain the outcome of attempting to apply the rule.

One approach to providing query developers with insight into the behavior of the query optimizer is to log all rule explanations. Logging the outcome of every fired rule provides a maximum amount of data for understanding what happened during query optimization. However, the query developer only needs to know the portion of the information that will enable tuning of the query. Information regarding successful query optimizations does not help with tuning. Even if only all failed rules are logged, it may still be difficult for a query developer to identify which failed optimizations are important to address. In the approach described herein, only optimization failures are tracked, not all rule outcomes are tracked. Also, the tracked optimization failures are filtered so that a developer is only presented with failures that are likely to significantly and adversely impact performance.

Figure 4:
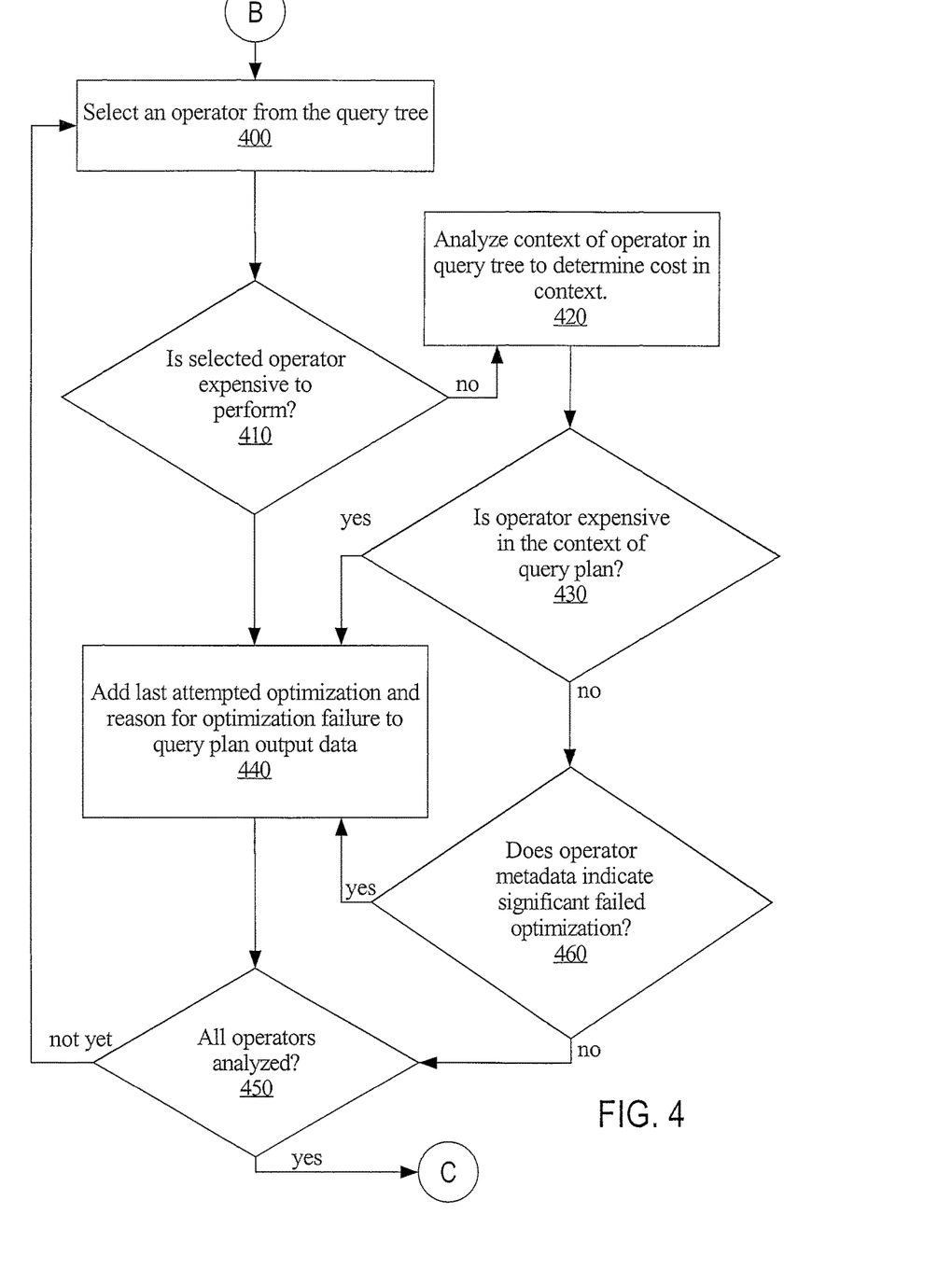
FIG. 4 is a flow diagram illustrating the steps for determining what feedback to provide to a query developer regarding failed query optimizations, according to an embodiment of the invention.

For each operator remaining in the query tree, criteria may be applied to determine whether or not to report a query optimization failure to the query developer. Criteria may include the expense of executing the operator, how many times the operator is executed in the plan, and the presence of other metadata associated with the execution of the operator such as system support (or lack thereof) for performing certain optimizations. FIG. 4 illustrates the steps for determining which failure messages to provide to the query developer according to an embodiment. A failure message may be created based on the stored metadata that captures the factors causing optimization failure, and explains the reason for the failure to the query developer. The failure messages may be displayed on the screen, written to a file, or any other way of communicating reasons for failure to a user. The steps examine each operator in the query tree. In Step 400 an operator is selected from the tree. In Step 410, the cost to execute the operator is evaluated. If the operator is expensive to perform, then in Step 440, an explanation is added to the output as to why the operator was not eliminated, and the flow continues to Step 450. In Step 450, a determination is made as to whether all operators in the tree have been evaluated. If so, then the process is finished. If there are more operators in the tree to evaluate, then the flow returns to Step 400. If in Step 410, the operator is determined not to be expensive, then the flow continues to Step 420, where the cost of the operator is determined based on the context of the operator in the query tree. Even an inexpensive operator that is executed very frequently can have an adverse affect on performance. For example, an operator used in a SELECT clause may impact query performance much less than the same operator executed for every row in a table, such as in a WHERE clause. In Step 430, if the operator in the context of the plan contributes a large portion of the overall query expense, the flow proceeds to Step 440 where this information is provided to the query developer.

As more than one attempted optimization may have taken place, in one embodiment, only the last reason for failure to remove an operation during optimization is provided to the query developer in Step 440.

If, in Step 460, the operator is determined to not be expensive to perform in the context of the query plan, the metadata stored regarding failed optimizations is examined to determine whether a failed optimization would have a significant impact on performance. For example, the operator may comprise performing an UPDATE on a path expression that uses the reverse axis on binary-encoded XML data which may not be performed by streaming. An alternative to the use of streaming binary data is to perform functional evaluation, which is expensive.

When analysis is complete for the current operator, if there are more operators left in the tree (Step 450), then another operator is selected, and the process continues until there are no more operators to analyze.

Example Explain Plan

In an embodiment, the explain plan may be generated with options to include different kinds and amount of information. Table 4 shows an example XML Query used to illustrate a portion of the explain plan that may include query rewrite and optimization related info.

TABLE 4

Sample XML Query

```
select xmlquery('<result>
    {for $i in
fn:collection("oradb:/A/PURCHASEORDER")//LineItem/Part
         where ($i/@Id cast as xs:integer) > 2500
         return
             <item_tuple>
                 { $i/../Description }
                 { $i/. }
             </item_tuple>
     }
     </result>' returning content)
from dual       ;
```

The XML section is a formatted, simplified and annotated extract of the unparsed query.

formatted: indention for better readability, line numbers
simplified: simplified operator names, omitting of irrelevant operators, query branches, and other information
annotated: analytics can be presented Table 5 shows the XML section of the Explain Plan that corresponds to the XML query shown in Table 4. An XML section in the explain plan consists of the following parts:

XML operator tree: The operator tree shows XML operators and their position in the query/DML—position means that the user sees an operator being a child of another operator in the query, for instance, the WHERE clause may have an XML operator as a child.

Diagnostics from performance analyzer: In addition to this 'XML aware plan' suboptimal constructs/operators may be listed together with the logical/physical reason and a reference to the relevant fragment(s) of the original query/DML with corresponding line number(s). The line numbers x01-x30 are used to specifically identify an operator that optimization failed to remove. The factors causing the optimization failure are explained including the line number and relevant content of the original query. In this example, the operator "parent" at line x08 requires functional evaluation of the XML fragment because the parent axis (" . . . "), that appears in line 6 of the original query, is not supported by streaming evaluation.

Physical issues (i.e. issues identified while attempting physical optimization) account for most of the execution cost, and logical issues (i.e. issues identified while attempting the logical optimization phase) account for very little of the execution cost. Thus, in an embodiment, operators with a logical issue but no physical issue may be considered optimal. In other words, an operator that has both a physical and logical issue may have both issues reported. The physical issue should be addressed, but there may be several ways of addressing the issue. Reporting the logical issue provides the developer with more information regarding how the query could be changed. However, if an operator only has a logical issue and no physical issue, the logical issue may not be reported. Addressing the logical issue may not reduce the execution cost, and changing the query to address the logical issue could introduce a different logical or physical issue that would increase the execution cost.

TABLE 5

XML Section of Explain Plan

```
x01     SELECT SYS_XQRYWRP(
x02         XMLELEMENT(NOMAPPING "result",
x03             (SELECT
x04                 SYS_IXMLAGG(
x05                     XMLELEMENT(NOMAPPING "item_tuple",
x06                         SYS_XQSEQ2CON(
x07                             SYS_XQEXTRREF
x08
(VALUE(KOKBF$1),'parent::node( )/Description')),
x09                         SYS_XQSEQ2CON(
x10                             SYS_XQEXTRREF(VALUE
x11                                 (KOKBF$1),'self::node( )'))))
x12         FROM
x13             TABLE(
x14                 XQSEQUENCE(
x15                     XQMKNODEREF((
x16                         SELECT
x17                             IXQAGG(
x18                                 MAKEXML("PURCHASEORDER"."XMLDATA"))
x19                                     FROM "PURCHASEORDER" )))),
x20             TABLE(
x21                 XQSEQUENCE(
```

TABLE 5-continued

XML Section of Explain Plan

```
x22                    SYS_XQEXTRREF( 'descendant-or-
self::LineItem/Part')))
x23         WHERE
x24             OPTXQCASTASNQ(
x25                 XQ_ATOMCNVCHK(
x26                     TO_NUMBER(
x27                         XQ_UPKXML2SQL(
x28                             XQEXVAL (
x29                                 XQEXTRREF('@Id'))))))>2500)))
x30         FROM "DUAL"
Suboptimal constructs found
line x08: Physical rewrite issue: "unsupported parent axis"
            line 6: { $i/../Description }
```

Conditional Execution of an Execution Plan

Figure 5:
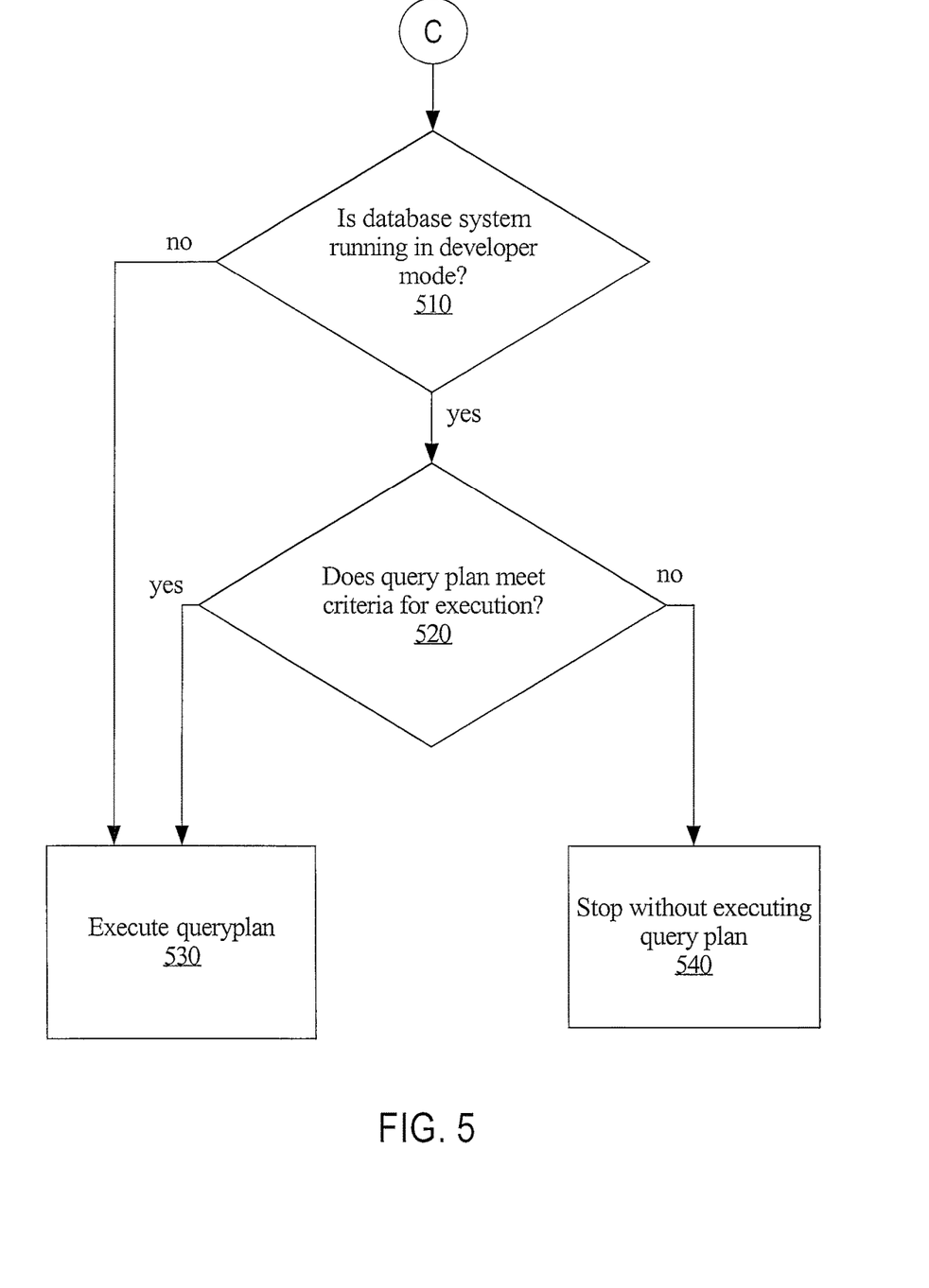
FIG. 5 is a flow diagram illustrating determining whether to execute the resulting query plan, according to an embodiment of the invention.

When the techniques described herein are used in the context of a developer tool, the resulting query execution plan may or may not be executed. Analogous to a code developer using a compiler to find syntax errors in code without linking, loading, and running the compiled code, the rewrite diagnosablility functionality may be used without actually executing a query being tuned. FIG. 5 illustrates the steps for determining whether or not to execute a query execution plan. In Step 510, the system determines whether it is running in a developer mode. If the system is not running in developer mode, then the execution plan is executed in Step 530. If the system is running in developer mode, then in Step 520, the execution plan is evaluated against criteria to determine whether to execute the plan. If the criteria are met, then the query plan is executed in Step 530. If the criteria are not met, the query execution stops in Step 540.

According to an embodiment, the developer mode may be configured to only execute the plan if there are no failed optimizations. In an embodiment, an error message may be displayed to indicate that the query did not execute due to optimization failures.

According to embodiment, an overall cost may be determined for the execution plan and considered along with the current load on the system to ensure that running the suboptimal plan will not adversely affect other work being performed on the system. According to yet another embodiment, the overall plan may be executed if the cost is below a certain threshold.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
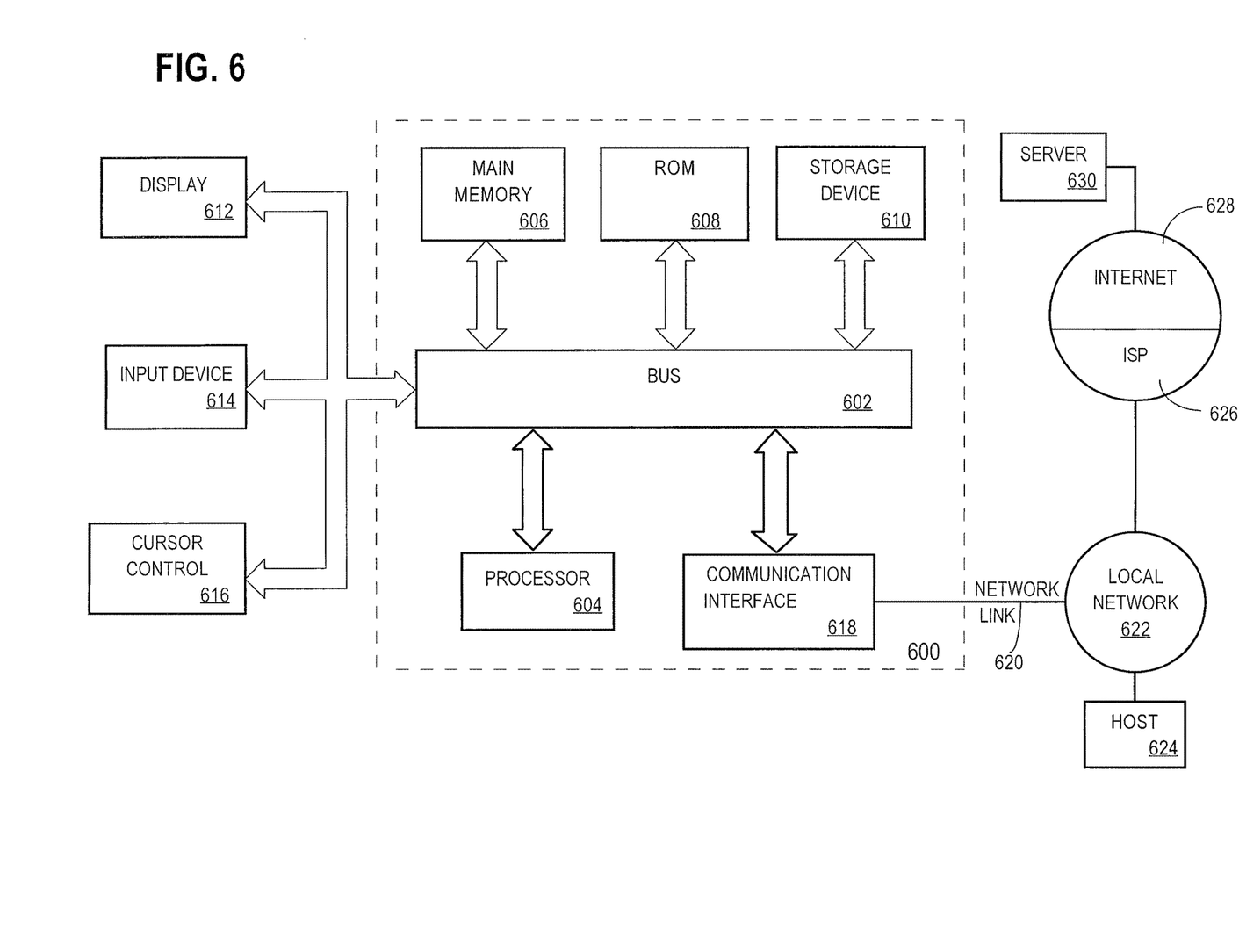
FIG. 6 is a block diagram that illustrates a computer system upon which an embodiment in accordance with the present invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a query plan for executing a query conforming to a database language;
      wherein generating a query plan includes:
      incorporating one or more operators into the query plan, wherein each of the one or more operators comprises a primitive operation; and
      generating query plan formation data that specifies one or more factors causing the incorporating of said one or more operators in the query plan;
   based on one or more criteria, generating query plan display output that includes for each operator of said one or more operators:
      output identifying said each operator; and
      output identifying a factor of said one or more factors causing the incorporating of said each operator in the query plan; and
   wherein the method is performed by one or more computing devices.

2. The method of claim 1, wherein the one or more factors specified by the query plan formation data indicates that a particular query rewrite optimization failed to eliminate said one or more operators associated with said one or more factors.

3. The method of claim 2, wherein the one or more factors specified by the query plan formation data further includes a reason why the particular query rewrite optimization failed to eliminate an operator of said one or more operators.

4. The method of claim 1, wherein for each operator of the one or more operators incorporated into the query plan, the one or more criteria comprise a cost of performing said each operator in the query plan.

5. The method of claim 1, wherein the query plan formation data and the query plan display output are only generated for particular types of operators that do not include all types of the one or more operators incorporated in the query plan.

6. The method of claim 4, wherein the one or more criteria include a number of times an operator is executed in the query plan.

7. The method of claim 3, further comprising:
in response to determining that one or more query rewrite optimizations failed to eliminate one or more operators from the query plan, determining not to execute the query plan.

8. The method of claim 1, wherein query plan formation data includes an indication that a particular query rewrite optimization failed to eliminate a particular operator from the query plan comprising:
in response to determining that a particular query rewrite optimization failed to eliminate an operator from the query plan, determining to add to the query plan display output the indication that the particular query rewrite optimization failed and a reason the particular query rewrite optimization failed to eliminate an operator from the query plan.

9. The method of claim 1, wherein the query is performed on a collection of XML documents stored in a database system;
wherein the query is expressed using XML constructs;
wherein one or more elements of each document of the collection of XML documents is stored in a column of a relational database table; and
the method further comprising re-writing the query using relational database constructs.

10. The method of claim 9, further comprising:
in response to determining that the query contains an XML construct for which there is no equivalent relational construct, determining that functional evaluation of a particular XML fragment cannot be avoided;
wherein functional evaluation of the particular XML fragment comprises constructing the particular XML fragment as an in-memory tree structure and performing navigation on the in-memory tree structure;
storing as a factor in association with a functional evaluation operator an indication that no relational operator can express the XML construct.

11. The method of claim 10, wherein the XML construct is backward navigation.

12. The method of claim 10, wherein the XML construct is sibling navigation.

13. The method of claim 2, wherein the particular query rewrite optimization is not able to rewrite the query using an index.

14. One or more non-transitory storage media storing one or more sequences of instructions which, when executed by one or more computing devices, cause:
generating a query plan for executing a query conforming to a database language;
wherein generating a query plan includes:
incorporating one or more operators into the query plan, wherein each of the one or more operators comprises a primitive operation; and
generating query plan formation data that specifies one or more factors causing the incorporating of said one or more operators in the query plan; and
based on one or more criteria, generating query plan display output that includes for each operator of said one or more operators:
output identifying said each operator; and
output identifying a factor of said one or more factors causing the incorporating of said each operator in the query plan.

15. The one or more non-transitory storage media of claim 14, wherein the one or more factors specified by the query plan formation data indicates that a particular query rewrite optimization failed to eliminate said one or more operators associated with said one or more factors.

16. The one or more non-transitory storage media of claim 15, wherein the one or more factors specified by the query plan formation data further includes a reason why the particular query rewrite optimization failed to eliminate an operator of said one or more operators.

17. The one or more non-transitory storage media of claim 14, wherein for each operator of the one or more operators incorporated into the query plan, the one or more criteria comprise a cost of performing said each operator in the query plan.

18. The one or more non-transitory storage media of claim 14, the one or more sequences of instructions comprising instruction that, when executed by said one or more computing devices, cause generating the query plan formation data and the query plan display output are only generated for particular types of operators that do not include all types of the one or more operators incorporated in the query plan.

19. The one or more non-transitory storage media of claim 17, wherein the criteria includes a number of times an operator is executed in the query plan.

20. The one or more non-transitory storage media of claim 16, the one or more sequences of instructions comprising instructions that, when executed by said one or more computing devices, cause:
in response to determining that one or more query rewrite optimizations failed to eliminate one or more operators from the query plan, determining not to execute the query plan.

21. The one or more non-transitory storage media of claim 14, wherein query plan formation data includes an indication that a particular query rewrite optimization failed to eliminate a particular operator from the query plan, wherein the one or more sequences of instructions comprise instructions that, when executed by said one or more computing devices, cause:
in response to determining that a particular query rewrite optimization failed to eliminate an operator from the query plan, determining to add to the query plan display output the indication that the particular query rewrite optimization failed and a reason the particular query optimization failed to eliminate an operator from the query plan.

22. The one or more non-transitory storage media of claim 14,
wherein the query is performed on a collection of XML documents stored in a database system;
wherein the query is expressed using XML constructs;
wherein one or more elements of each document of the collection of XML documents is stored in a column of a relational database table; and
the one or more sequences of instructions comprising instructions that, when executed by said one or more computing devices, cause re-writing the query using relational database constructs.

23. The one or more non-transitory storage media of claim 22, the one or more sequences of instructions comprising instructions that, when executed by said one or more computing devices, cause:
in response to determining that the query contains an XML construct for which there is no equivalent relational construct, determining that functional evaluation of a particular XML fragment cannot be avoided;
wherein functional evaluation of the particular XML fragment comprises constructing the particular XML fragment as an in-memory tree structure and performing navigation on the in-memory tree structure;
storing as a factor in association with a functional evaluation operator an indication that no relational operator can express the XML construct.

24. The one or more non-transitory storage media of claim 23, wherein the XML construct is backward navigation.

25. The one or more non-transitory storage media of claim 23, wherein the XML construct is sibling navigation.

26. The one or more non-transitory storage media of claim 15, wherein the particular query rewrite optimization is not able to rewrite the query using an index.

* * * * *